United States Patent [19]

Hirano et al.

[11] Patent Number: 4,704,566
[45] Date of Patent: Nov. 3, 1987

[54] SELF-STARTING DISK-TYPE BRUSHLESS MOTOR WITH SCREW PROJECTION FOR GENERATING COGGING

[75] Inventors: Norimitsu Hirano, Yamato; Masataka Ogawa, Atsugi, both of Japan

[73] Assignee: Shicoh Engineering Co., Ltd., Yamato, Japan

[21] Appl. No.: 876,185

[22] Filed: Jun. 19, 1986

[51] Int. Cl.$^4$ .............................................. H02K 29/08
[52] U.S. Cl. .................................... 318/254; 318/138; 310/156; 310/216
[58] Field of Search ....................... 318/138, 254, 439; 310/49 R, 67 R, 68 R, 156, 185, 188, 216, 218, 268

[56] References Cited

U.S. PATENT DOCUMENTS

| 3,988,024 | 10/1976 | Watanabe et al. | 310/268 X |
| 4,103,191 | 7/1978 | Kawamura et al. | 310/49 R |
| 4,256,997 | 3/1981 | Brusaglino et al. | 318/138 X |
| 4,496,887 | 1/1985 | Ichihara et al. | 310/156 X |
| 4,499,407 | 2/1985 | MaCleod | 310/156 X |

FOREIGN PATENT DOCUMENTS

| 53-140520 | 12/1978 | Japan | 310/49 R |
| 54-153211 | 12/1979 | Japan | 318/138 |
| 58-207853 | 12/1983 | Japan | 318/138 |
| 60-141156 | 7/1985 | Japan | 318/254 |

Primary Examiner—William M. Shoop, Jr.
Assistant Examiner—Bentsu Ro
Attorney, Agent, or Firm—Frishauf, Holtz, Goodman & Woodward

[57] ABSTRACT

A disk-type brushless motor comprises a 2p-pole magnet rotor (p represents an integer of 2 or more) having alternating N and S poles and a single position sensor element. A stator armature having an armature coil is formed on two conductors which contribute to the generation of torques and extend with an opening angle substantially equal to the width of each magnetic pole of the magnet rotor. A projection such as a screw for generating cogging to enable the self-start of the magnet rotor is disposed at a place somewhere short substantially by a width $$Pw4 + n \cdot Pw$$

wherein
Pw is a width per pole of the magnet rotor, and
n is a positive integer of 1 or more, from the conductor which contributes to the generation of torques toward the rotational direction of the magnet rotor.

6 Claims, 15 Drawing Figures

4,704,566

SELF-STARTING DISK-TYPE BRUSHLESS MOTOR WITH SCREW PROJECTION FOR GENERATING COGGING

BACKGROUND OF THE INVENTION

1. Field of the Invention

This invention relates to a disk-type brushless motor, particularly to a disk-type brushless motor having one position sensor.

2. Description of the Prior Art

In recent years, there is a strong demand for brushless motors, suitable for such apparatus, especially disk-type brushless motors. Since such disk-type brushless motors are also useful as disk-type brushless fan motors for office machines, there is a demand, depending on machines to be incorporated therein, toward disk-type brushless fan motors which are extremely economical, small, thin and flattened.

As a brushless motor capable of satisfying the above-mentioned requirements to a highest possible degree, a disk-type brushless motor having an armature coil and a position sensor may be contemplated. Such a disk-type brushless motor cannot however be caused to rotate continuously, although it may be possible to rotate its magnet rotor over a certain predetermined range. Even if a motor equipped with only one armature coil and one position sensor should be able to rotate, it is unexpectable to obtain any large rotary force with such a single armature coil. For large rotary forces, it is indispensable to use two or more armature coils.

When designing, for example, a disk-type brushless motor having two armature coils as stator armatures, it has conventionally been necessary to use two position sensors. Namely, it has been required, for permitting continuous rotation, to design such a disk-type brushless motor into a two-phase disk-type brushless motor which requires two position sensors. Magnetoelectric transducers or converter elements such as Hall elements or Hall IC devices are often used as position sensors. These position sensors are however costly. It is certainly preferred from the viewpoint of mass production of economical, small and disk-type brushless motors, if each of such motors can be constructed with a single position sensor.

However, use of a single position sensor is accompanied by such a problem that similar to the above-mentioned motor with a single coil, the motor cannot start by itself when the position sensor detects the boundary area between an N pole and its matching S pole of the magnet rotor, namely, the dead point at the time of its start. Namely, the torque of a brushless motor reaches zero at the point where the current is switched over.

Japanese Utility Model Serial Nos. 56659/83 and 28958/83 disclose a disk-type brushless motor which includes a single position sensor element and two coils and which has a good efficiency and is inexpensive, wherein even with only one position sensor element, the self-start can be assured. According to these Utility Model Applications, it is possible to provide an inexpensive and useful disk-type brushless motor wherein a magnet rotor generates cogging in its most appropriate position and even with only one position sensor element, the magnet rotor can be constantly shifted from a dead point to a state in which it can self-start, thereby stopping the motor.

There has been proposed another disk-type brushless motor wherein only one armature coil is used to provide the same effect as in the use of two armature coils as described above.

SUMMARY OF THE INVENTION

It is, therefore, an object of the present invention to provide such a disk-type brushless motor in which other positions of places suitable to generate cogging are included, in addition to the above-described position.

It is another object of the present invention to provide a disk-type brushless motor which has a good efficiency and further, is inexpensive and suitable for mass production and which enables the generation of cogging even with only one position sensor element.

To achieve the objects, according to the invention, a disk-type brushless motor comprises a 2p-pole magnet rotor (where p represents an integer of 2 or more) having alternating N and S poles, a stator armature having an armature coil formed on two conductors which contribute to the generation of torque and extend with an opening angle substantially equal to the width of each magnetic pole of the magnet rotor, a single position sensor element, and means for generating cogging to enable the self-start of the magnet rotor, the means for generating cogging being disposed at a place somewhere short substantially by a width $$Pw/4 + n \cdot Pw$$

wherein
Pw is a width per pole of the magnet rotor, and
n is a positive integer of 1 or more,
from the conductor which contributes to the generation of torques toward the rotational direction of the magnet rotor.

With such an arrangement, even if the position sensor element is only one, the generation of cogging can be assured at its most appropriate place and hence, the self-start can be assured to provide a stable rotation, leading to a good efficiency and an inexpensiveness of the disk-type brushless motor.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
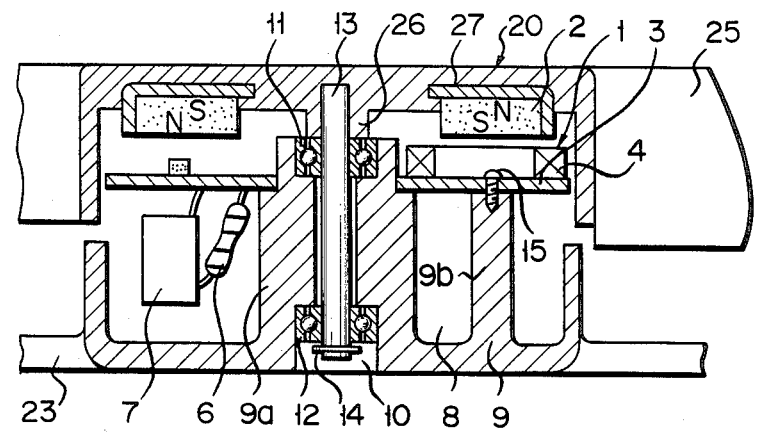
FIG. 1 is a longitudinal sectional view of a disk-type brushless fan motor according to a first embodiment of the present invention.
Figure 2:
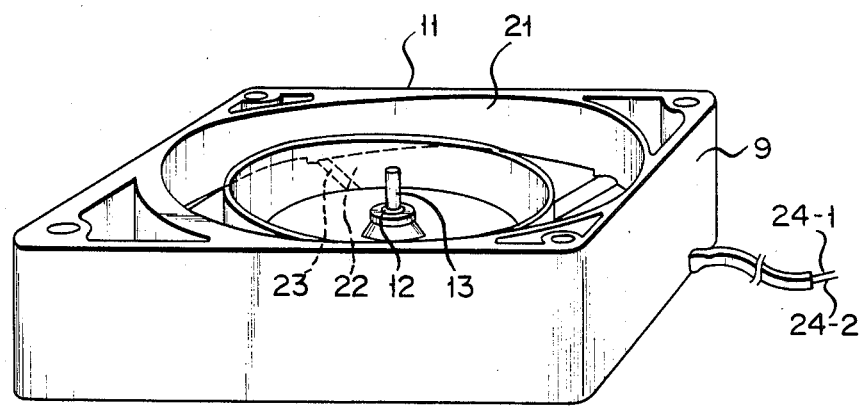
FIG. 2 is a perspective view of a case of the motor shown in FIG. 1.
Figure 3:
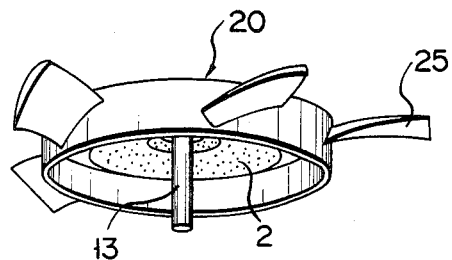
FIG. 3 is a perspective view of a fanned cup member incorporated in the motor.
Figure 4:
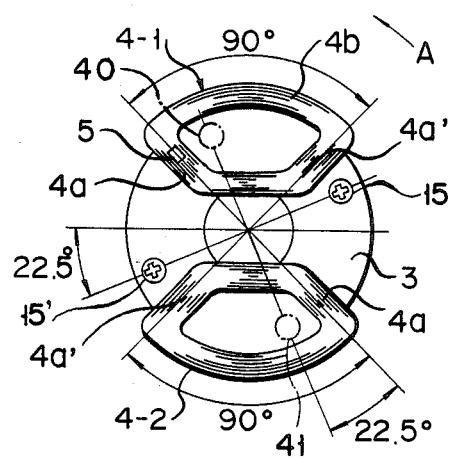
FIG. 4 is a top plan view of a stator armature incorporated in the motor.

Referring to FIG. 1, there is shown a 4-pole, one-phase disk-type brushless motor according to a first embodiment of the present invention, which includes a single position sensor element and two armature coils. A space 8 is utilized to incorporate electric parts for a power control circuit, thereby providing inexpensive good-performance disk-type brushless motors and disk-type brushless fan motors. For example, an axially flat disk-type brushless fan motor includes a rectangular case 9 which has a central through hole 10 defined by an upwardly extending projection 9a. Bearing journals 11 and 12 are provided in the openings at the upper and lower ends of the through hole 10. A rotary shaft 13 is rotatably journaled at the substantially central portion of a body of the disk-type brushless fan motor by the bearing journals 11 and 12. A slip-off preventing E-ring 14 is mounted on the lower portion of the rotary shaft 13. The reference numeral 21 designates a recess formed in the case 9 (see FIG. 2) and the numeral 22 an air-intake opening, the numeral 23 a stay, the numeral 24-1 and 24-2 a positive power supply line and a negative power supply line, respectively. The reference numeral 9b denotes a post mounted on the case 9. A printed circuit board 3 is fixedly mounted on the top of the post 9b by a screw 15 made of a magnetic material. Another post 9b is also mounted at a place not shown and angularly spaced through 180° C. from the aforesaid post. Two armature coils 4-1 and 4-2 are symmetrically arranged on the printed circuit board 3 as shown in FIG. 4 and form a stator armature 1. The armature 1 is opposed, in a face-to-face relation, to an axially flat cup member 20 made of a plastic material with fan blades. The cup member 20 is integrally formed, on its outer periphery, with fan blades 25 and, on its inner surface at the substantially central portion thereof, with a boss 26. The upper end of the rotary shaft 13 is fixedly mounted on the boss 26 to rotate together therewith. The cup member 20 has an annular magnetic yoke 27 secured on the inner surface thereof.

Figure 5:
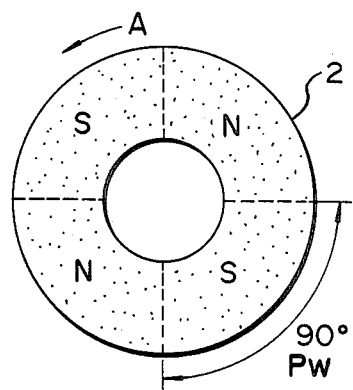
FIG. 5 is a bottom plan view of a 4-pole annular field magnet incorporated in the motor.

A 4-pole field magnet 2 or a magnet rotor having alternating N and S magnetic poles shown in FIG. 5 is fixedly mounted on the lower surface of the yoke 27 in face-to-face opposition to the stator armature 1. The two armature coils 4-1 and 4-2 are symmetrically arranged on the surface of the printed circuit board 3 which is opposed to the field magnet 2 in such a manner not to be superposed on each other, and each armature coil is formed by winding a wire around conductors 4a and 4a' which contribute to the generation of torques and extend with an opening angle substantially equal to the width of each magnetic pole of the magnet 2. As shown in FIG. 1, electric parts for a power control circuit, such as a transistor 7, a resistor 6, etc., are arranged on the lower surface of the printed circuit board 3. It is to be noted that because the conductor 4b around the periphery of the armature coils 4-1, 4-2 does not contribute to the generation of torques, a field magnet 2 having a radius reduced by the width of the conductor 4b may be used. Moreover, it is to be understood that since the field magnet 2 used is of 4-pole type, the armature coils 4-1 and 4-2 are formed with the opening angle of 90° between the axial conductors 4a and 4a' which contribute to the generation of torques. A magnetoelectron transducer or converter element 5 such as a Hall element or a Hall IC device used as a position sensor element is disposed on that lower surface of the printed circuit board 3 which is opposed to the conductor 4a of the armature coil 4-1 (see FIG. 4).

Screws 15 and 15' made of a magnetic material for securing the stator armature 1 on the top surface of the post 9b are threadedly mounted at a place (at which the post 9b is positioned) somewhere short substantially by a width:

$$Pw/4 + n \cdot Pw \quad (1)$$

wherein Pw is a width per magnetic pole of the field magnet 2, and n is a positive integer of 1 or more, from the conductors 4a and 4a' of the armature coils 4-1 and 4-2 which contribute to the generation of torques toward the direction (indicated by an arrow A in FIG. 5) of rotation of the field magnet 2. More specifically, since the field magnet 2 is annular and is of a 4-pole type having alternating N and S magnetic poles as shown in FIG. 5 in this first embodiment, the width Pw per magnetic pole of the field magnet 2 is of 90 degrees, and the magnetic pole width corresponding to a quarter of the width per magnetic pole is of 22.5 degrees. Therefore, when n is 1 in the above expression (1), the screw 15 made of a magnetic material is positioned at a place somewhere short substantially by an angular width of 112.5 degrees in the circumferential direction from one conductor 4a of the armature 4-1 which contributes to the generation of torques toward the direction (indicated by an arrow A in FIG. 5) of rotation of the field magnet 2. Also, the screw 15' made of a magnetic material is positioned at a place spaced by 112.5 degrees in the clockwise direction away from one conductor 4a of the armature 4-2 which contributes to the generation of torques. According to the above expression (1), the places at which such screws 15 and 15' made of a magnetic material are to be positioned includes those 40 and 41 encircled by a one-dot chain line and therefore, the screws 15 and 15' may be positioned at such places 40 and 41. The reason why the screws 15 and 15' have been threadedly mounted to the aforesaid places is for the purpose of fixing the stator armature 1 on the post 9b by the screws 15 and 15', while at the same time, facilitating the positioning of the above-mentioned projections formed by screws 15 and 15' and enabling the control of the cogging force. Such screws 15 and 15' allow cogging to be produced, and even if the converter element 5 is only one, the rotor is enebled to self-start. More particularly, even if the converter element is only one, a twin-coiled, one-phase disk-type brushless fan motor is enabled to self-start by forming the projections made of a magnetic material by the screws 15 and 15' at the aforesaid places such that the field magnet 2 may be attracted to the projections (the screws 15 and 15') to enable the converter element 5 self-start, i.e., at the places such that the converter element 5 may be stopped at a location in which it would not detect a dead point.

In this embodiment, the screw 15' is mounted at a place symmetrical through 180 degrees relative to the screw 15 to further enable the self-starting of the rotor, but even with either one of the screws 15 and 15', the purpose will be achieved, and the screws may be mounted at all the aforesaid places. If the screw 15 or 15' is mounted, the field magnet 2 may be stopped in such a manner that the N and S poles thereof may be attracted and opposed by the screw 15 or 15'. Accordingly, the converter element 5 constantly detects the N or S pole of the field magnet 2, i.e., does not detect the dead point or is not opposed to the dead point and hence, if a current in a predetermined direction is applied to the armature coil 4-1 or 4-2, the rotor having the field magnet 2 can be rotated in a predetermined direction.

The provision of the projections or the screws 15 and 15' made of a magnetic material on the stator armature 1 is intrinsically not preferred and causes the undesirable generation of cogging. In the present disk-type brushless fan motor, however, the cogging produced by the screws 15 and 15' made of a magnetic material can be effectively used to provide the continuous rotation of the rotor. Therefore, only one position sensor element suffices, leading to an inexpensive one-phase disk-type brushless motor or disk-type brushless fan motor.

Figure 6:
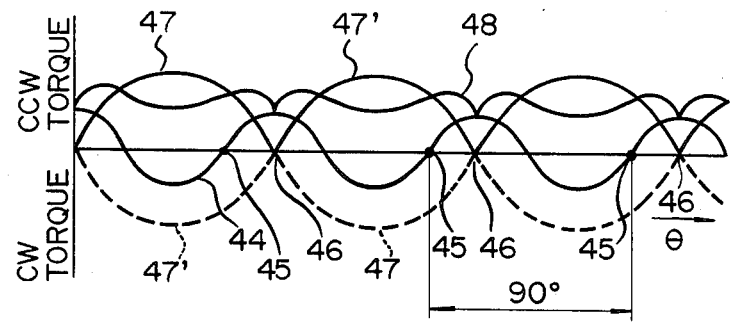
FIG. 6 illustrates torque curves taken when the disk-type brushless fan motor is used in a rated voltage stage.

FIG. 6 illustrates torque curves when the motor is used in a rated voltage state. As apparent from the torque curves in FIG. 6, the cogging torque curve 44 is up to a zero point 46. The zero point 46 is a so-called dead point and is spaced by a quarter of the magnetic pole of the field magnet 2, i.e., 22.5 degrees away from the stable point 45. The stable points 45 appear at four places in total for every one rotation. It is contemplated by the present invention that cogging torque is generated in the dead point 46 to prevent the torque from becoming zero. Therefore, such dead point 46 is an unstable point, so that a smaller external force may permit the field magnet 2 to be rotated in either direction. This can be understood from the fact that the cogging torque curve 44 is developed due to the 4-pole field magnet 2 and the screws 15 and 15' made of a magnetic material.

The relationship between the armature torque and the rotational angle, when a current flows across the armature coils 4-1 and 4-2, is represented by armature torque curves indicated by the reference numerals 47 and 47'. The zero points 46 in these curves 47 and 47', as is apparent from the above description, is slightly on the right side or in the clockwise direction from the stable point 45 which is the zero point in the cogging torque curve 44. Upon the application of a commutation effect by the converter element 5 and a power control circuit which will be described hereinafter, the upper halves of the armature torque curves 47 and 47' are developed and thus, the composite torque curve indicated by the reference numeral 48 is obtained from the combination of such upper halves with the cogging torque curve 44. Consequently, the dead point is eliminated as described above, and a stable operation can be assured.

It should be noted that because the cogging torque at the zero point 46 is an extremely smooth waveform, the field magnet 2 can rotate smoothly, thus providing a good performance for the disk-type brushless fan motor.

Conductors 4a and 4a', of the armature coils 4-1 and 4-2, which contribute to the generation of torques are arranged at equal distances at an electrical angle of 180 degrees (at a mechanical angle of 90 degrees in this embodiment). The other terminal of the conductor 4a', contributing to the generation of torques, of the armature coil 4-1 and one terminal of the conductor 4a, contributing to the generation of torques, of the armature coil 4-2 are commonly connected. One terminal of the conductor 4a, contributing to the generation of torques, of the armature coil 4-1 is connected to a junction point 30 between the collector of a transistor 28 and the collector of a transistor 29 within the power control circuit, while the other terminal of the conductor 4a', contributing to the generation of torques, of the armature coil 4-2 is connected to a junction point 33 between the collector of a transistor 31 and the collector of a transistor 32. The power control circuit is formed into a one-phase energized control circuit. The emitters of the transistors 28 and 31 are connected to a power supply terminal 34, respectively, while the emitters of the transistors 29 and 32 are connected to the ground 35, respectively. The converter element 5 is connected at its output terminal 36-1 to the bases of the transistors 28 and 32 constituting the power control circuit and at its output terminal 36-2 to the bases of the transistors 29 and 31. Accordingly, when the converter element 5 detects the N pole of the field magnet 2, the transistors 28 and 32 are energized through the output terminals 36-1, so that a current can be permitted to flow across the armature coils 4-1 and 4-2 in the arrow direction to provide the rotational force in the arrow A direction. When the converter element 5 detects the S pole of the field magnet 2, the transistors 29 and 32 are energized through the output terminals 36-2, so that a current can be permitted to flow across the armature coils 4-1 and 4-2 in the direction opposite to the above direction to provide the rotational force in the arrow A direction.

Figure 8:
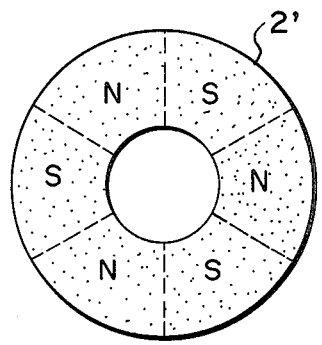
FIG. 8 is a bottom plan view of a 6-pole field magnet incorporated in a disk-type brushless fan motor according to a second embodiment of the present invention.
Figure 9:
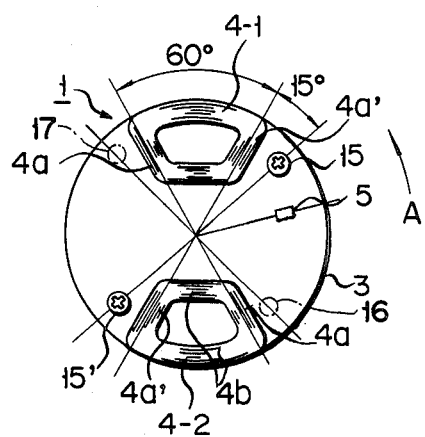
FIG. 9 is a top plan view of a stator armature incorporated in the second embodiment.

A second embodiment of the present invention will now be described with reference to FIGS. 8 to 10. FIG. 8 is a bottom plan view of an annular 6-pole field magnet 2' or magnet rotor, and FIG. 9 is a top plan view of a stator armature having two armature coils 4-1 and 4-2. A magnetoelectron converter element 5 is disposed on a printed board 3 at a place under a condition equal to a conductor 4a, of the armature coil 4-1, contributing the generation of torques (see FIG. 9). Screws 15 and 15' are threadedly mounted at places determined according to the above-described expression (1), respectively. Alternatively, the screws 15 and 15' may be threadedly mounted at places indicated by one-dot chain lines according to the expression (1).

Figure 7:
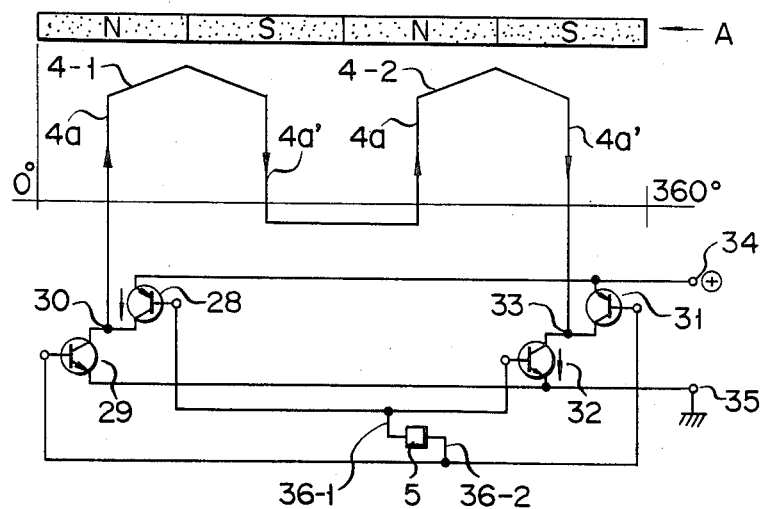
FIG. 7 is a development diagram of a field magnet and armature coil group (stator armature) of a 4-pole, 2-coiled and one-phase disk-type brushless fan motor.
Figure 10:
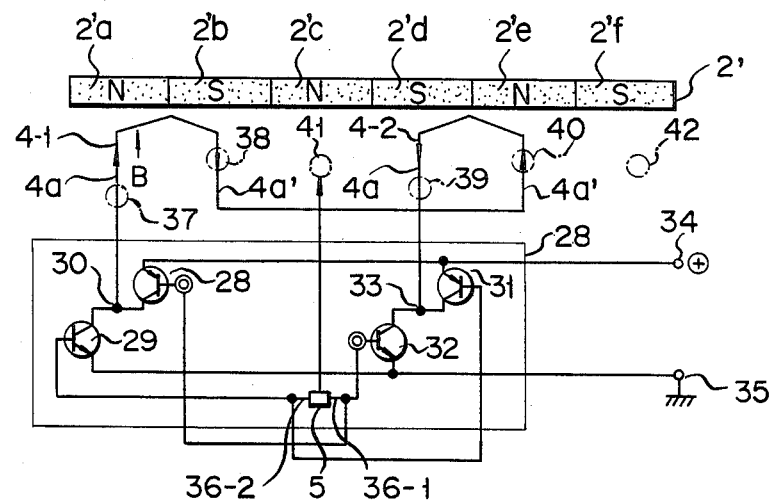
FIG. 10 is a development diagram of a field magnet and an armature coil group of a 6-pole, 2-coiled and one-phase brushless fan motor.

FIG. 10 is a development diagram of the 6-pole field magnet 2' and the two armature coils 4-1 and 4-2. Referring to FIG. 10, conductors 4a of the armature coils 4-1 and 4-2 which contribute to the generation of torques are connected to junction points 30 and 33 within the power control circuit, respectively, while the other conductors 4a' of the armature coils 4-1 and 4-2 which contribute to the generation of torques are commonly connected. The power control circuit has been described in connection to FIG. 7 and therefore, a detailed description thereof is omitted here. A magnetoelectron converter element 5 has been shown as being disposed on the lower surface of the conductor 4a, contributing to the generation of torques, of the armature coil 4-1 in the previously described embodiment, but in some cases, it cannot be positioned at such place. It has also been already described above that the converter element 5 cannot be described on the conductor 4a, contributing to the generation of torques, of the armature coil 4-1. In such second embodiment, taking it into consideration, with reference to FIG. 10, whether the converter element 5 is to be disposed at a place 37 indicated by a one-dot chain line and opposed to the conductor 4a, contributing to the generation of torques, of the armature coil 4-1, as a result of seeking an equivalent place to such place 37 indicated by the chain line because such place 37 is opposed to a place substantially midway of the N pole 2'a of the field magnet 2', it has been found that places 40 and 41 encircled by one-dot chain lines and substantially midway of the N poles 2'c and 2'e correspond to such equivalent place. However, because the place 40 is opposed to the conductor 4'a, contributing to the generation of torques, of the armature coil 4-2, the converter element 5 cannot be disposed at such place 40 as in the above-described cases, whereas since the place 41 is not opposed to the armature coils 4-1 and 4-2, the magnetron converter element 5 can be disposed on the surface of the printed circuit board 3 at such place 41. In addition, in consideration of places 38 and 39 encircled by one-dot chain lines and opposed to the conductors 4'a, contributing the generation of torques, of the armature coils 4-1 and 4-2, upon seeking a place equivalent to such places 38 and 39 because the latter places are opposed to the substantially middle portions of the S poles 2'b and 2'd of the field magnet 2', it has been found that a place 42 encircled by a one-dot chain line and opposed to the substantially middle portion of the S pole 2'f corresponds to such equivalent place. Therefore, the converter element 5 may be disposed at such place 42 on the surface of the printed board 3.

Figure 11:
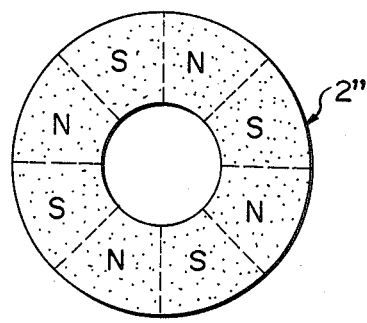
FIG. 11 is a bottom plan view of an 8-pole field magnet incorporated in a disk-type brushless fan motor according to a third embodiment of the present invention.
Figure 12:
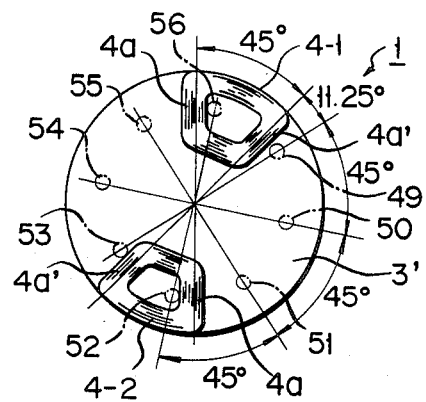
FIG. 12 is a plan view of a stator armature when the field magnet shown in FIG. 11 is used.
Figure 13:
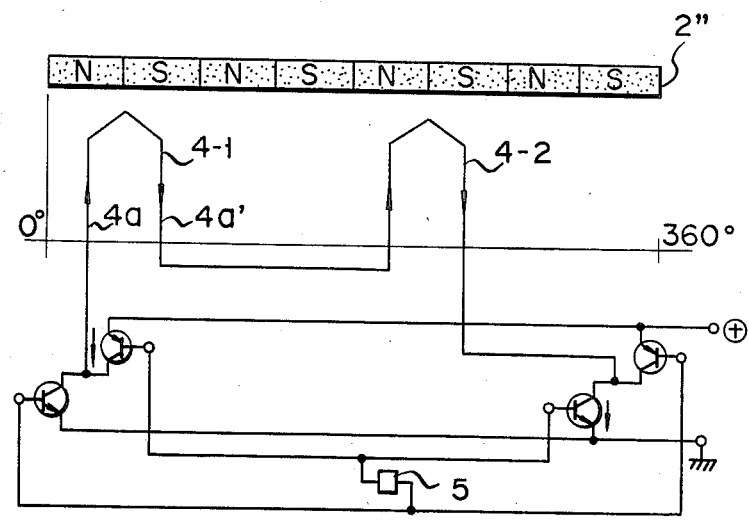
FIG. 13 is a development diagram of the field magnet shown in FIG. 11 and the stator armature shown in FIG. 12.

FIGS. 11 to 13 illustrate a third embodiment of the present invention. In the third embodiment, use is made of an 8-pole field magnet 2' having alternating N and S poles as shown in FIG. 11 and of a stator armature 1 having armature coils 4-1 and 4-2 formed with an opening angle of 45 degrees between axial conductors 4a and 4'a contributing the generation of torques and symmetrically disposed through 180 degrees on the surface of the printed circuit board, as shown in FIG. 12. FIG. 13 is a development diagram of the field magnet 2' shown in FIG. 11 and the stator armature 1 shown in FIG. 12. Detailed descriptions of these components are omitted because they can be understood from the description for the above embodiments. Upon selecting suitable places at which the screws 15 and 15' made of a magnetic material are to be threadedly mounted, on the basis of the conductor 4a contributing to the generation of torques of the armature coil 4-1 according to the above expression (1), places 49 --- 56 encircled by one-dot chain lines correspond to such suitable places, and thus, the screws may be disposed at such suitable places.

Figure 14:
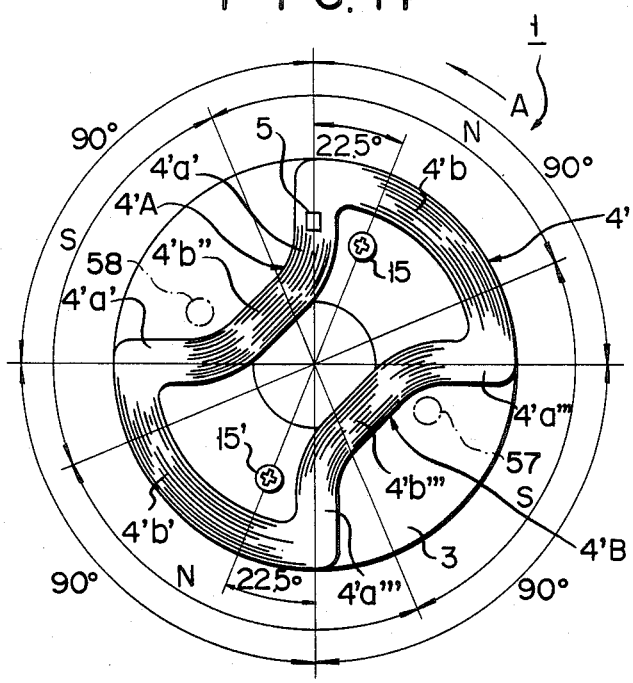
FIG. 14 is a top plan view of a stator armature incorporated in a disk-type brushless fan motor according to a fourth embodiment of the present invention.

FIG. 14 is a top plan view of a stator armature 1 incorporated in a fourth embodiment of the present invention and corresponds to FIG. 4. In the embodiment illustrated in FIG. 4, use has been made of the armature coils 4-1 and 4-2 divided into two as shown in FIG. 4, whereas in the fourth embodiment, use is made of a single armature coil 4' comparable to the integral formation of two armature coils so that the same rotational torque can be developed as with two armature coils 4-1 and 4-2. Therefore, the fourth embodiment is different in this respect from the embodiment illustrated in FIG. 4. The armature coil 4' shown in FIG. 14 is formed into a gourd-shaped flame-type coil to provide for the use of a 4-pole field magnet 2 (see FIG. 5). The armature coil 4' is disposed on the printed circuit board 3. Inclined conductors 4'a–4'a''' of the armature coil 4' contribute to the generation of torque, and other peripheral conductors 4'b and 4'b' and conductors 4'b'' and 4'b''' between the conductors 4'a and 4'a' and between the conductors 4'a'' and 4'a''' each contributing to the generation of torque do not contribute to the generation of torque. It should be noted that the armature coil 4' of such configuration can be easily mass-produced, but when it is to be produced manually in a smaller quantity, the armature coil 4' may be formed into a rectangular flame-like configuration by winding a wire. Then, the conductors 4'b'' and 4'b'''' may be urged in a direction to become opposed to each other so as to provide a configuration as shown in FIG. 14 to secure the resulting coil. In FIG. 14, the character N and S are given at the outer periphery of the drawing so as to understand the relationship between the N and S poles of the 4-pole field magnet 2 opposed to the armature coil 4' in a face-to-face relation. As clear from such description, the screws 15 and 15' which generate a cogging force are threadedly mounted at places determined according to the above-described expression (1), respectively. According to the expression (1), places 57 and 58 encircled by one-dot chain lines correspond to such places and therefore, the screws 15 and 15' made of a magnetic material may be threadedly mounted at the places 57 and 58, respectively.

The armature coil 4' is formed into a configuration such that the conductor portion 4'A (also including the conductor 4'b'' which does not contribute the generation of torque) including the conductors 4'a and 4'a' which contribute the generation of torque and the other conductor portion 4'B (also including the conductor 4'b''' which does not contribute the generation of torque) including conductors 4'a'' and 4'a''' which contribute the generation of torque can be opposed to two N and S magnetic poles. Moreover, the formation of the armature coils 4' is also such that the opening angle between the conductors 4'a and 4'a'' and between 4'a' and 4'a''' which contribute the generation of torque is substantially equal to the width of the magnetic pole of the field magnet 2. Accordingly, even only one armature coil enables the generation of the same rotational torque as in the use of the two conventional armature coils 4–1 and 4-2. As described above, the armature coil 4' in the fourth embodiment is characterized by such a configuration that both of the two conductor portions 4'A and 4'B contributing to the generation of torque can be opposed to at least two magnetic poles of N and S poles of the field magnet 2 to enable the flow of current in the same direction. It is noted that a development diagram of the armature coil 4' and the field magnet 2 is the same as that in FIG. 7, and hence, the description thereof is omitted.

Figure 15:
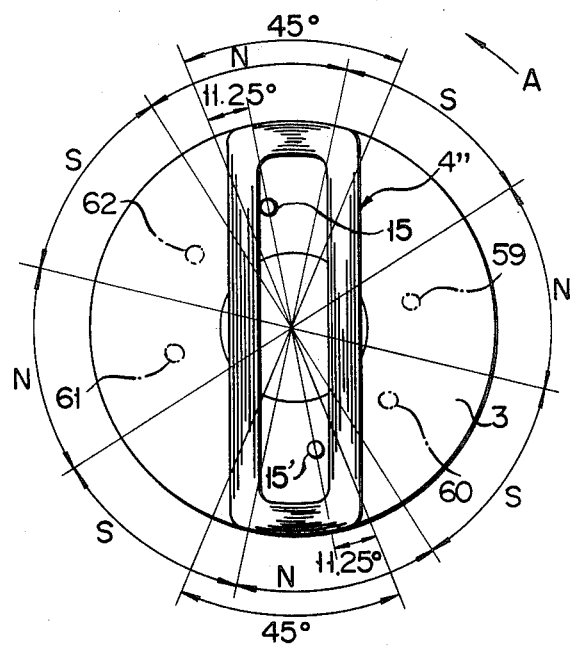
FIG. 15 is a top plan view of a stator armature incorporated in a disk-type brushless fan motor according to a fifth embodiment of the present invention.

FIG. 15 shows a top plan view of a stator armature incorporated in a fifth embodiment of the present invention and corresponds to FIG. 12. In this embodiment, a single armature coil 4" is formed into a rectangular flame-like configuration which is easy to form, and such coil is designed to be able to generate the same rotational torque as in the two conventional armature coils 4-1 and 4-2 in the same manner as in the above-described armature coils 4. With the armature coil formed into the rectangular flame-like configuration in this way, the generated torque may be slightly degraded, but a smooth rotation can be assured which is advantageous. Screws 15 and 15' are disposed in places according to the above-described expression (1). According to the expression (1), there are other places suitable for the threaded mounting of the screws 15 and 15' to generate cogging, and such other places correspond to place 59, --- , 62 encircled by one-dot chain lines. It should be noted that in addition to above places, two further places exist which are suitable to generate cogging in the embodiment illustrated in FIG. 15, but such further places fall on the position of the armature coil 4" and hence, are not preferred so much and not shown in FIG. 15.

As should be apparent from the above description, according to the present invention, even with only one position sensor element which is located at a most preferred place a cogging force can be generated. Therefore, it is possible to provide a brushless motor which can self-start and ensure a stable rotation and which has a good efficiency and further, is inexpensive and suitable for mass production. In the foregoing embodiments, the embodiments of the disk-type brushless fan motor have been described, but the present invention is, of course, applicable to other disk-type brushless motors. The armature coil has been described as being formed by winding a wire in the embodiments, but those may be used which are formed of a printed pattern or a so-called sheet coil. Further, double and triple armature coils are also applicable. The field magnet has been employed as being of an annular type having a plurality of integral magnetic poles, but a field magnet of a type having separated magnetic poles may be used. In generating cogging, the screws made of a magnetic material have been employed, but the present invention is not limited thereto, and other magnetic materials, for example, those which can be affixed to the printed circuit board with an adhesive may be used. In addition, the magnetic material for generating cogging necessarily need not be mounted at the stator armature on the printed circuit board, but may be mounted at a place on the fixed side around the outer periphery of the field magnet.

What is claimed is:

1. A disk-type brushless motor comprising:
   a 2p-pole magnet rotor (where p represents an integer of 2 or more) having alternating N and S poles;
   a stator armature having an armature coil formed on two conductors which contribute to the generation of torques and extend with an opening angle substantially equal to the width of each magnetic pole of the magnet rotor;
   a single position sensor element; and
   means for generating cogging to enable the self-start of the magnet rotor, said means for generating cgging being disposed at a place somewhere short substantially by a width $$Pw/4 + n \cdot Pw$$

wherein
   Pw is a width per pole of the magnet rotor, and
   n is a positive integer of 1 or more,
   from the conductor which contributes to the generation of torques toward the rotational direction of the magnet rotor;
   said means for generating cogging including at least one projection made of a magnetic material being disposed at said place therein, said at least one projection being coupled to said stator armature and a fixing member, for attaching said stator armature to said fixing member.

2. The disk-type brushless motor of claim 1, wherein said at least one projection comprises a pair of said projections, each made of magnetic material.

3. The disk-type brushless motor of claim 2, wherein said pair of projections are substantially diametrically opposed on said rotor.

4. A disk-type brushless motor comprising:
   a 2p-pole magnet rotor (where p represents an integer of 2 or more) having alternating N and S poles;
   a stator armature having an armature coil formed on two conductors which contribute to the generation of torques and extend with an opening angle substantially equal to the width of each magnetic pole of the magnet rotor;
   a single position sensor element; and
   means for generating cogging to enable the self-start of the magnet rotor, said means for generating cogging being disposed at a place somewhere short substantially by a width $$Pw/4 + n \cdot Pw$$

wherein
   Pw is a width per pole of the magnet rotor, and
   n is a positive integer of 1 or more,
   from the conductor which contributes to the generation of torques toward the rotational direction of the magnet rotor;
   said mean for generating cogging including at least one projection made of a magmnetic material being disposed at said place therein, said at least one projection comprising a screw-like member for attaching the stator armature on a fixing member.

5. The disk-type brushless motor of claim 4, wherein said at least one projection comprises a pair of said screw-like members.

6. The disk-type brushless motor of claim 5, wherein said pair of screw-like members are substantially diametrically opposed on said rotor.

* * * * *